(12) United States Patent
Yamagajo et al.

(10) Patent No.: US 7,880,680 B2
(45) Date of Patent: Feb. 1, 2011

(54) TAG DEVICE, ANTENNA, AND PORTABLE CARD

(75) Inventors: Takashi Yamagajo, Kawasaki (JP); Toru Maniwa, Kawasaki (JP); Manabu Kai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 836 days.

(21) Appl. No.: 11/822,528

(22) Filed: Jul. 6, 2007

(65) Prior Publication Data

US 2007/0262871 A1    Nov. 15, 2007

Related U.S. Application Data

(63) Continuation of application No. PCT/JP2005/000091, filed on Jan. 7, 2005.

(51) Int. Cl.
*H01Q 7/00* (2006.01)
*H01Q 11/12* (2006.01)
*G06K 19/00* (2006.01)

(52) U.S. Cl. ................ 343/718; 343/744; 343/873; 340/572.7

(58) Field of Classification Search .......... 343/718, 343/743, 744, 866, 867, 873; 340/572.7, 340/572.8; 235/491, 492
See application file for complete search history.

(56) References Cited

U.S. PATENT DOCUMENTS

| | | | |
|---|---|---|---|
| 4,547,776 A * | 10/1985 | Bolt et al. | ............ 343/741 |
| 6,285,342 B1 | 9/2001 | Brady et al. | |
| 6,900,773 B2 * | 5/2005 | Poilasne et al. | ............ 343/795 |
| 6,919,857 B2 * | 7/2005 | Shamblin et al. | ............ 343/795 |
| 7,289,075 B2 * | 10/2007 | Kagaya et al. | ............ 343/741 |

FOREIGN PATENT DOCUMENTS

JP    08-088586    4/1996

(Continued)

OTHER PUBLICATIONS

Korean Patent Office Action issued on Nov. 27, 2008 in Korean Patent Application No. 10-2007-7015567.

(Continued)

*Primary Examiner*—Michael C Wimer
(74) *Attorney, Agent, or Firm*—Fujitsu Patent Center

(57) ABSTRACT

A tag device that performs high-quality radio communication without radio wave radiation or receiving characteristics being deteriorated near a person's body and without hindering communication by another IC tag. A main loop section sends and receives radio waves. The main loop section is a metal foil and has the shape of a long thin loop. The area of the main loop section is smaller than the area of a dielectric substrate. The main loop section covers part of surfaces of the dielectric substrate and part of sides of the dielectric substrate so as to put the dielectric substrate inside the loop. The main loop section is mounted in a horizontal direction of the dielectric substrate. Each of capacitive load sections is a metal foil and has a load corresponding to a capacitance component. The capacitive load sections are located at both end portions of the main loop section which covers part of the front side of the dielectric substrate and are located at both end portions of the main loop section which covers part of the reverse side of the dielectric substrate. A control unit is connected to the main loop section and controls information via the radio waves.

23 Claims, 16 Drawing Sheets

FOREIGN PATENT DOCUMENTS

| | | |
|---|---|---|
| JP | 09-260925 | 10/1997 |
| JP | 2000068726 A | 3/2000 |
| JP | 2003-249814 | 9/2003 |
| JP | 2004-213582 | 7/2004 |
| JP | 2004-287767 | 10/2004 |
| JP | 2004-355442 | 12/2004 |
| JP | 2006-053833 | 2/2006 |
| JP | 2006-128953 | 5/2006 |

OTHER PUBLICATIONS

Office Action dated Mar. 30, 2010 issued in corresponding Japanese Patent Application No. 2006-550567.

Japanese Patent Office Action issued on Apr. 7, 2009 in Japanese Patent Application No. 2006-550567.

European Search Report issued in EP 05703359.9, dated Oct. 21, 2008.

* cited by examiner

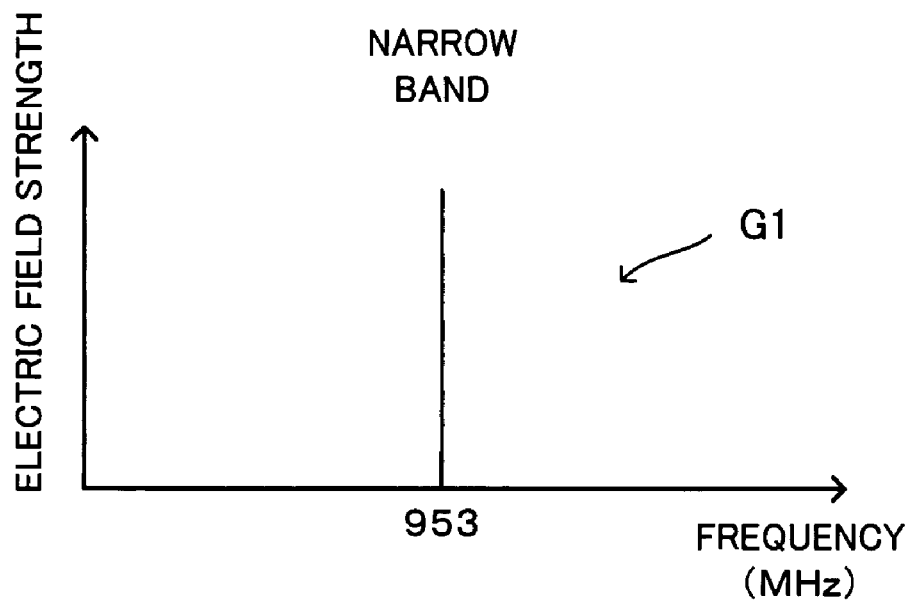
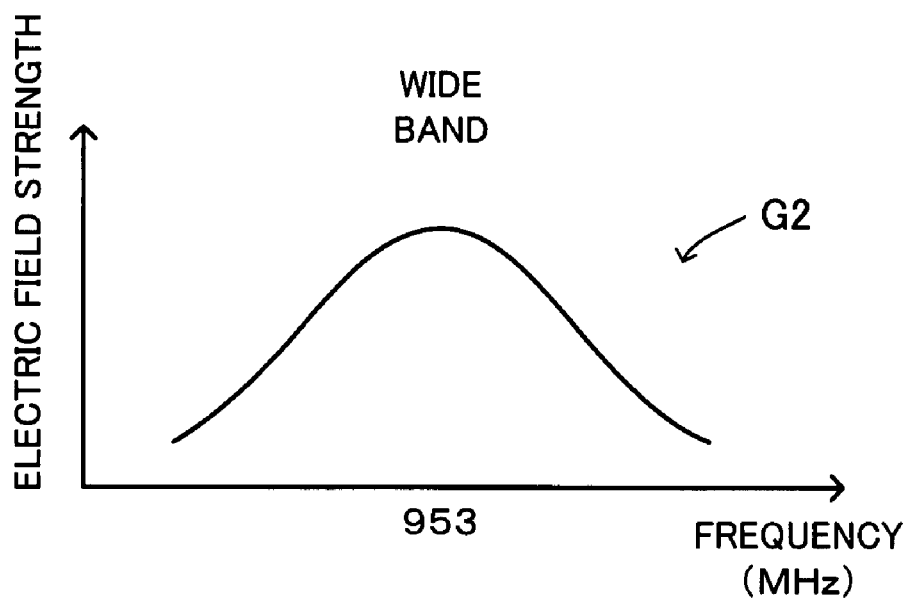
FIG. 5

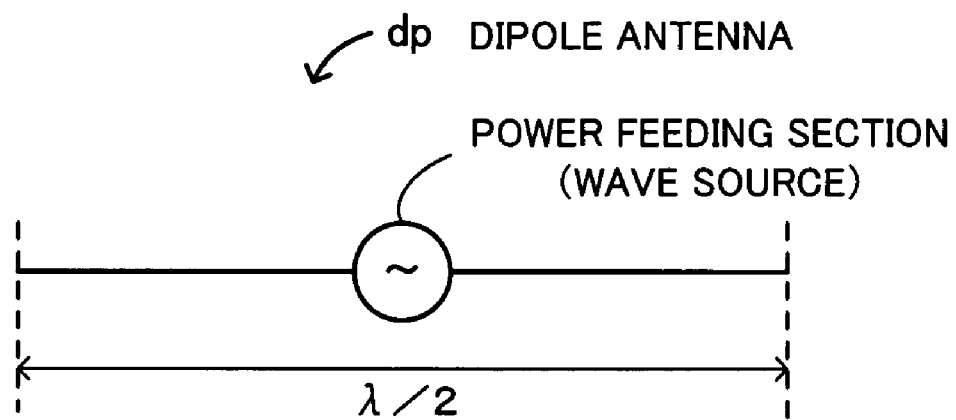
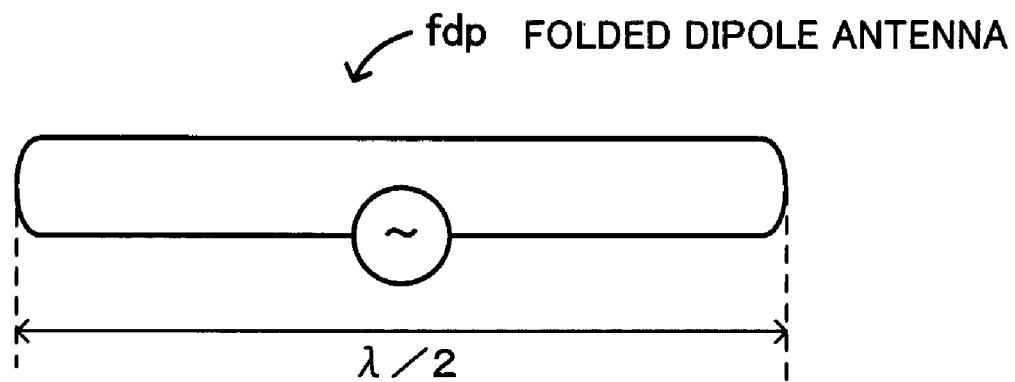
FIG. 14

TAG DEVICE, ANTENNA, AND PORTABLE CARD

This application is a continuing application, filed under 35 U.S.C. §111(a), of International Application PCT/JP2005/000091, filed Jan. 7, 2005.

BACKGROUND OF THE INVENTION

1. Field of the Invention

This invention relates to a tag device, an antenna, and a portable card and, more particularly, to a tag device for performing radio communication, an antenna for radiating and receiving radio waves, and a portable card for performing radio communication.

2. Description of the Related Art

In recent years attention has been riveted on an automatic identification technique called radio frequency-identification (RFID). The RFID is a kind of radio communication system by which an object on which an IC tag is put is automatically identified by radio on a noncontact basis. With the RFID, IC tags can be put on all objects and be connected to networks. Accordingly, the development of the RFID has advanced swiftly as a technique which is effective in building the next generation of ubiquitous network society.

The RFID system includes a reader/writer and an IC tag. By performing radio communication via each antenna, information is written from the reader/writer to the IC tag or information stored in the IC tag is read out.

Conventionally, the 13.56 MHz frequency band or the 2.45 GHz frequency band has been used in the RFID. However, in recent years attention has been riveted on IC tags using an ultrahigh-frequency (UHF) band (300 to 3,000 MHz).

Such IC tags use 952 to 954 MHz in particular in the UHF band for performing communication. Compared with existing IC tags using the 13.56 MHz frequency band or the 2.45 GHz frequency band, communication distance to readers/writers can be lengthened and areas in which communication can be performed can be widened.

On the other hand, an IC tag does not include a power source (battery). Accordingly, when a reader/writer communicates with an IC tag, the IC tag obtains electric power from radio waves radiated from the reader/writer or a magnetic field produced by the reader/writer.

That is to say, roughly speaking, there are two methods for generating electric power in the RFID. One is a radio wave method and the other is an electromagnetic induction method. With an IC tag using the 2.45 GHz frequency band or a UHF band, the radio wave method in which radio waves radiated from a reader/writer are converted into electric power is adopted. With an IC tag using the 13.56 MHz frequency band, the electromagnetic induction method in which electric power is obtained from a magnetic field produced near an antenna of a reader/writer is adopted.

FIG. 12 is a view showing the concept of the radio wave method. An RFID system 100 which performs communication by using the 2.45 GHz frequency band or a UHF band comprises a reader/writer 110 and an IC tag 120. The IC tag 120 includes an antenna 121, a rectifying circuit 122, and a control circuit 123.

When the IC tag 120 receives radio waves sent from the reader/writer 110 via the antenna 121, the rectifying circuit 122 rectifies the radio waves which are alternating current signals into direct current signals. The direct current signals are used as a power source and are applied to the control circuit 123 which exercises modulation/demodulation control and logical control.

FIG. 13 is a view showing the concept of the electromagnetic induction method. An RFID system 200 which performs communication by using the 13.56 MHz frequency band includes a loop antenna 210 of a reader/writer and a loop antenna 220 of an IC tag (loop antenna has a structure in which a conductor is looped in the shape of a circle or a square).

It is assumed that the loop antennas 210 and 220 are in close proximity to each other. If an electric current ia is passed counterclockwise through the loop antenna 210 of the reader/writer, an upward magnetic field H1 is produced as shown in FIG. 13. Just then, an electric current ib runs clockwise through the loop antenna 220 of the IC tag so as to cancel out the magnetic field H1, and a downward magnetic field H2 is produced.

With an IC tag using the 13.56 MHz frequency band, a loop antenna is used and an electric current is generated in this way by a magnetic field produced because of electromagnetic induction. As a result, electric power can be obtained. (In the 13.56 MHz frequency band, the loop antenna is used for making electromagnetic induction occur. However, the loop antenna itself is used not only for making electromagnetic induction occur but also for radiating ordinary radio waves.)

With the radio wave method described in FIG. 12, as the frequency of the radio waves becomes lower (wavelength of the radio waves becomes longer), longer-distance communication can be performed. Accordingly, on simple consideration it turns out that the communication distance of an IC tag using a UHF band is at least about three times the communication distance of an IC tag using the 2.45 GHz frequency band.

With the electromagnetic induction method described in FIG. 13, on the other hand, the loop antenna of the reader/writer and the loop antenna of the IC tag must be in close proximity to each other. When the IC tag using the 13.56 MHz frequency band is distant from the reader/writer, the magnetic field weakens sharply and electric power cannot be secured.

Specific communication distance of an IC tag using the 13.56 MHz frequency band is 70 to 80 cm maximum and specific communication distance of an IC tag using the 2.45 GHz frequency band is about 2 m maximum. Experiments showed that specific communication distance of an IC tag using a UHF band is about 7 m (theoretical value is about 10 m).

Basically dipole antennas (folded dipole antennas, for example) with a length of $\lambda/2$ ($\lambda$ is the wavelength of radio waves) are used as antennas of IC tags using the 2.45 GHz frequency band or a UHF band.

The length of an antenna of an IC tag using each frequency band will now be calculated. $\lambda$ (wavelength)=C (velocity of light)/f (frequency), so the length of an antenna of an IC tag using the 2.45 GHz frequency band is calculated in the following way. $3\times10^8/(2.45\times10^9) \approx 0.122$ (m) Half of 0.122 (m) is about 6 (cm). Therefore, the length of the antenna of the IC tag using the 2.45 GHz frequency band is about 6 cm.

Similarly, the length of an antenna of an IC tag using a UHF (953 MHz, for example) frequency band is calculated. $3\times10^8/(953\times10^6) \approx 0.3$ (m) Half of 0.3 (m) is about 15 (cm). That is to say, the length of the antenna of the IC tag using the 953 MHz frequency band is about 15 cm. (Therefore, to simply obtain calculated communication distance on the basis of antenna length without changing electrical length, the IC tag using the 2.45 GHz frequency band should hold an antenna with a length of 6 cm minimum and the IC tag using the 953 MHz frequency band should hold an antenna with a length of 15 cm minimum.)

It is assumed that an IC tag using the 13.56 MHz frequency band uses a dipole antenna for obtaining electric power by the radio wave method. $3\times10^8/(13.56\times10^6)\approx22$ (m) Half of 22 (m) is about 11 (m). Therefore, the length of the dipole antenna is about 11 m. This length is not practical. For this reason, an IC tag using the 13.56 MHz frequency band obtains electric power not by the radio wave method but by the electromagnetic induction method.

The disadvantage of IC tags using the 13.56 MHz frequency band is that communication distance cannot be lengthened. On the other hand, the communication distance of IC tags using the 2.45 GHz frequency band is 2 m, so they are practical in a fairly wide range. With IC tags using the 2.45 GHz frequency band, however, radio waves at a frequency of 2.45 GHz are intercepted or absorbed if a liquid, such as water or alcohol, is near the IC tags (2.45 GHz is the same as the frequency of electronic ovens).

With IC tags using a UHF band, on the other hand, communication distance is long and the disadvantage of IC tags using the 2.45 GMHz frequency band does not exist. Accordingly, compared with the case where IC tags using existing frequency bands are used, it is easy for a reader/writer to read a plurality of IC tags in the block. In addition, radio waves in a UHF band are diffracted significantly, so an IC tag which cannot be seen from the reader/writer can be read.

IC tags using a UHF band have many such advantages and much hope is placed on them. However, under the present conditions the realization of efficient RFID services in an environment in which IC tags using a UHF band and the existing 13.56 MHz and 2.45 GMHz frequency bands are included is desired.

Conventionally, an IC tag coated with a thin flexible protection laminate is disclosed (see, for example, Japanese Unexamined Patent Publication No. 8-88586 (paragraphs [0018]-[0021] and FIG. 3)).

If the RFID is used, services may widely be provided by the use of IC tag cards. For example, portable cards in which IC tags are embedded are used for managing the alighting and boarding of users of railroads or airplanes or making purchases in department stores and the like.

Conventionally, folded dipole antennas have been used in many IC-tags using a UHF band.

FIG. 14 is a view showing a folded dipole antenna. A dipole antenna dp radiates radio waves when high-frequency waves are supplied from a power feeding section (wave source) located in the middle of a conductor. The dipole antenna dp is a linear antenna of the most basic type (antenna length is basically $\lambda/2$). A folded dipole antenna fdp has a structure in which a conductor corresponding to one wavelength is folded back with the dipole antenna dp as a basis.

Usually a card is carried in a person's breast pocket or is put over a reader/writer with a person's hand. That is to say, there are many cases where a card is touching a person's body. However, when a card in which an IC tag using a UHF band and including the above folded dipole antenna fdp is embedded is near a person's body, radio waves radiated are intercepted or absorbed by the person's body. As a result, the radio wave radiation and receiving characteristics deteriorate.

FIG. 15 is a view showing a problem with a conventional card using a UHF band. In FIG. 15, the dipole antenna dp is near a person's body. (The basic principles of the folded dipole antenna fdp are the same as those of the dipole antenna dp, so for the sake of simplicity the dipole antenna dp is shown and described.)

Usually an electric current i1 shown in FIG. 15 runs through the dipole antenna dp and radio waves v are radiated. If human skin or the like is near the dipole antenna dp, then an electric current i2 is generated on the surface of the person's body which is a conductor. The electric currents i1 and i2 run in opposite directions. As a result, the electric currents i1 and i2 cancel out each other. Accordingly, it is difficult for the electric current i1 to run through the dipole antenna dp. This means that the radio waves v are not fully radiated.

Ground plane antennas which are plane antennas are also used widely in IC tag cards regardless of used frequency bands such as a UHF band.

FIG. 16 is a view showing a ground plane antenna. A ground plane antenna 300 has a structure in which a GND plate (ground plane) 302 is located on one surface (reverse) of a dielectric substrate 301 and in which a radiation element 303 is located on the other surface (front) of the dielectric substrate 301. (High-frequency signals are supplied by, for example, connecting an internal conductor (core) of a coaxial cable (not shown) to the radiation element 303 and connecting an external conductor of the coaxial cable to the GND plate 302.)

The ground plane antenna 300 has the two side of the reverse and the front. If the front of the ground plane antenna 300 on which the radiation element 303 is located is turned toward a person's body, the same phenomenon that was described in FIG. 15 occurs. Accordingly, with the ground plane antenna 300, the radio waves v radiated are intercepted or absorbed by the person's body. As a result, the radio wave radiation and receiving characteristics deteriorate.

As stated above, under the present conditions RFID services are provided by performing communication not by the use of a single frequency band but by the use of a plurality of frequency bands including a UHF band and the 13.56 MHz frequency band.

Therefore, some cards use UHF bands and others use the 13.56 MHz frequency band. When a person carries cards, the cards using different frequency bands will be put in a wallet, a commutation-ticket holder, or the like.

As described in FIG. 13, however, the electromagnetic induction method is adopted for an IC tag included in a card using the 13.56 MHz frequency band. If a second card using a UHF band or 2.45 GHz frequency band is placed on the front or the back of a loop antenna of the IC tag in a wallet or the like, then a magnetic field produced by the loop antenna cannot pass through due to obstruction by an IC tag included in the second card. This means that an electric current does not run through the loop antenna. As a result, the IC tag using the 13.56 MHz frequency band does not function and communication cannot be performed.

For example, a card using the 13.56 MHz frequency band and a card using a UHF band are put-in a commutation-ticket holder, one over the other. If the card using the 13.56 MHz frequency band is put over a reader/writer in this state, then radio waves to be radiated or received by the card using the 13.56 MHz frequency band are obstructed by a conductor portion in the card using the UHF band.

SUMMARY OF THE INVENTION

The present invention was made under the background circumstances described above. An object of the present invention is to provide a tag device for performing high-quality radio communication without radio wave radiation or receiving characteristics being deteriorated near a person's body and without hindering communication by another IC tag.

Another object of the present invention is to provide an antenna for performing high-quality radio communication without radio wave radiation or receiving characteristics being deteriorated near a person's body and without hindering communication by another IC tag.

Still another object of the present invention is to provide a portable card for performing high-quality radio communication without radio wave radiation or receiving characteristics being deteriorated near a person's body and without hindering communication by another IC tag.

To accomplish the above object, the present invention provides a tag device for performing radio communication. This device comprises: an antenna unit including a main loop section being a loop-like metal foil mounted on a surface of a dielectric substrate for sending and receiving radio waves, and capacitive load sections being metal foils connected to the main loop section and each having a load corresponding to a capacitance component; and a control unit connected to the main loop section for controlling information via the radio waves.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a schematic view showing the electric field strength of radiated UHF band radio waves.

FIG. 14 is a view showing a folded dipole antenna.

DESCRIPTION OF THE PREFERRED EMBODIMENTS

Figure 1:
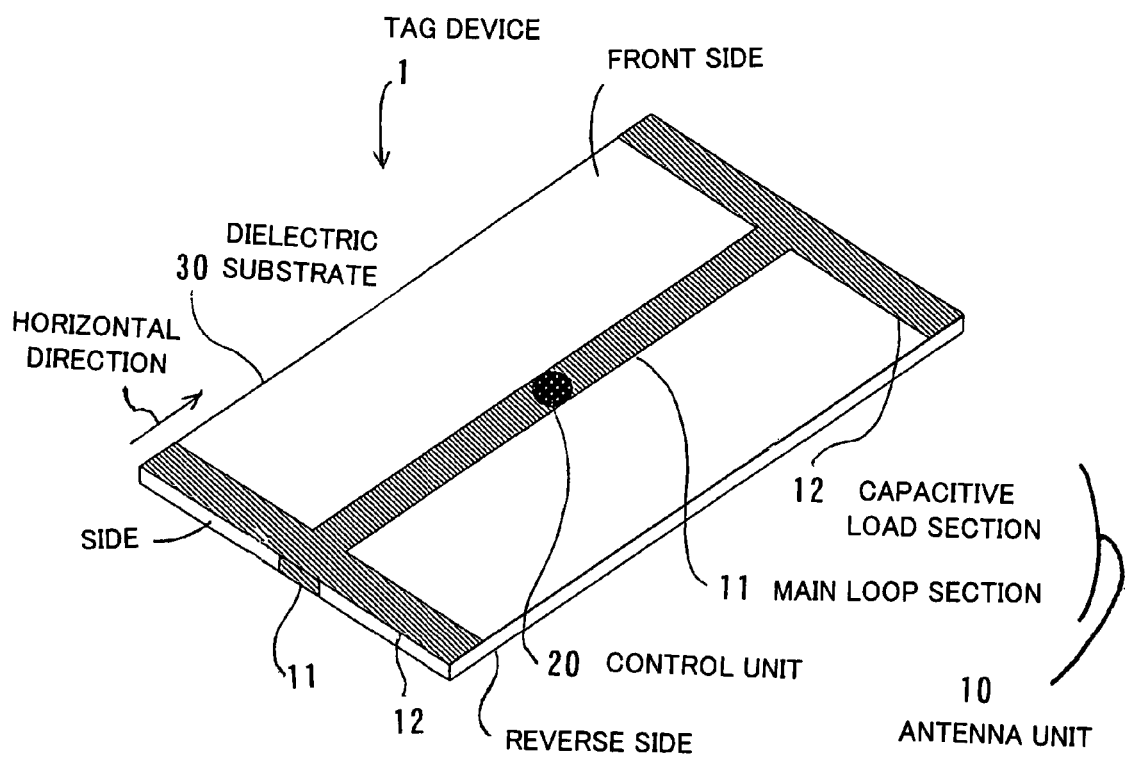
FIG. 1 is a view for describing the principles underlying a tag device.

Embodiments of the present invention will now be described with reference to the drawings. FIG. 1 is a view for describing the principles underlying a tag device. A tag device 1 comprises an antenna unit 10, a control unit 20, and a dielectric substrate 30. The tag device 1 is used for performing radio communication and is used as, for example, an RFID IC tag using a UHF band.

The antenna unit 10 includes a main loop section 11 and capacitive load sections 12. The main loop section 11 is a loop-like metal foil mounted on the surface of the dielectric substrate 30 and sends and receives radio waves. (That is to say, the main loop section 11 fulfills a chief part of an antenna function.) Each of the capacitive load sections 12 is a metal foil connected to the main loop section 11 and has a load corresponding to a capacitance component.

As shown in FIG. 1, the main loop section 11 of the antenna unit 10 has the shape of a long thin loop and its area is smaller than the area of the dielectric substrate 30. The main loop section 11 covers part of the surfaces (both of the front side and the reverse side) of the dielectric substrate 30 and part of sides of the dielectric substrate 30 so as to put the dielectric substrate 30 inside the loop. In this case, the main loop section 11 is mounted in a horizontal direction of the dielectric substrate 30.

The capacitive load sections 12 are located at both end portions of the main loop section 11 which covers part of the front side of the dielectric substrate 30 (or at end portions of the dielectric substrate 30). The capacitive load sections 12 (not shown) are also located at both end portions of the main loop section 11 which covers part of the reverse side of the dielectric substrate 30. (The capacitive load sections 12 are not located on the sides of the dielectric substrate 30.) The control unit 20 is connected to the main loop section 11 and controls information via the radio waves. The control unit 20 is an electronic circuit component and corresponds to an IC chip. The control unit 20 is actually mounted over the main loop section 11 (mounted in the middle of the main loop section 11 in FIG. 1).

Control of information means, for example, demodulating information received (from a reader/writer) via the main loop section 11 and writing the information to an internal memory or reading out information to be sent (to the reader/writer) via the main loop section 11 from the internal memory and modulating the information. The tag device 1 obtains electric power by the above radio wave method. Therefore, the control unit 20 also functions as a radiator (feeding section) and includes a rectifying circuit.

Figure 2:
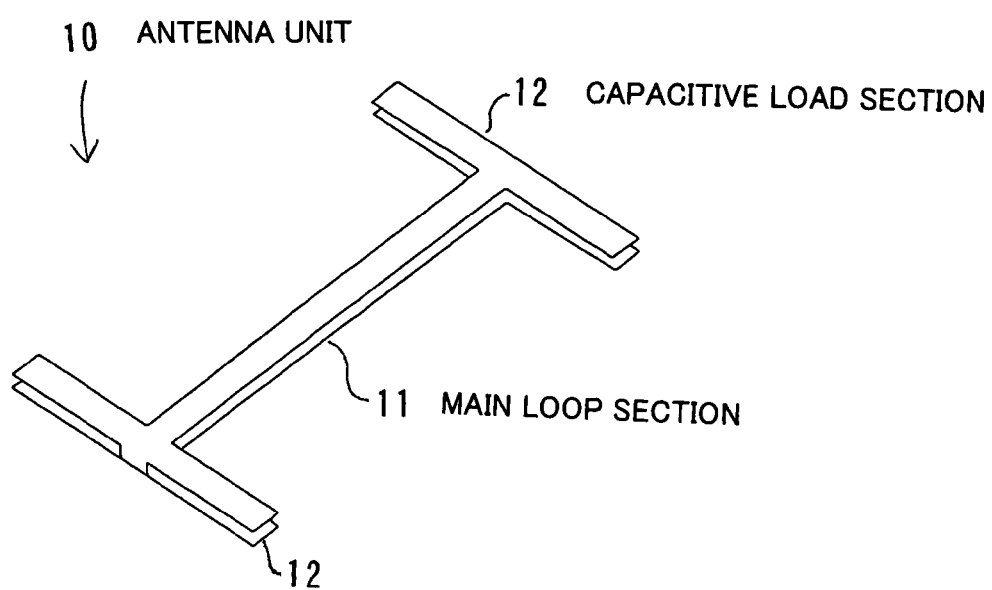
FIG. 2 is an external view of an antenna unit.

FIG. 2 is an external view of the antenna unit 10. The main loop section 11 has the shape of a long thin loop and the capacitive load sections 12 are located at both end portions of the main loop section 11. By connecting the capacitive load sections 12 perpendicularly to both end portions of the loop-like main loop section 11, the antenna unit 10 becomes an antenna having the shape of the letter "H". The tag device 1 has a structure in which the dielectric substrate 30 shown in FIG. 1 is put in the antenna unit 10 having the above shape.

Figure 3:
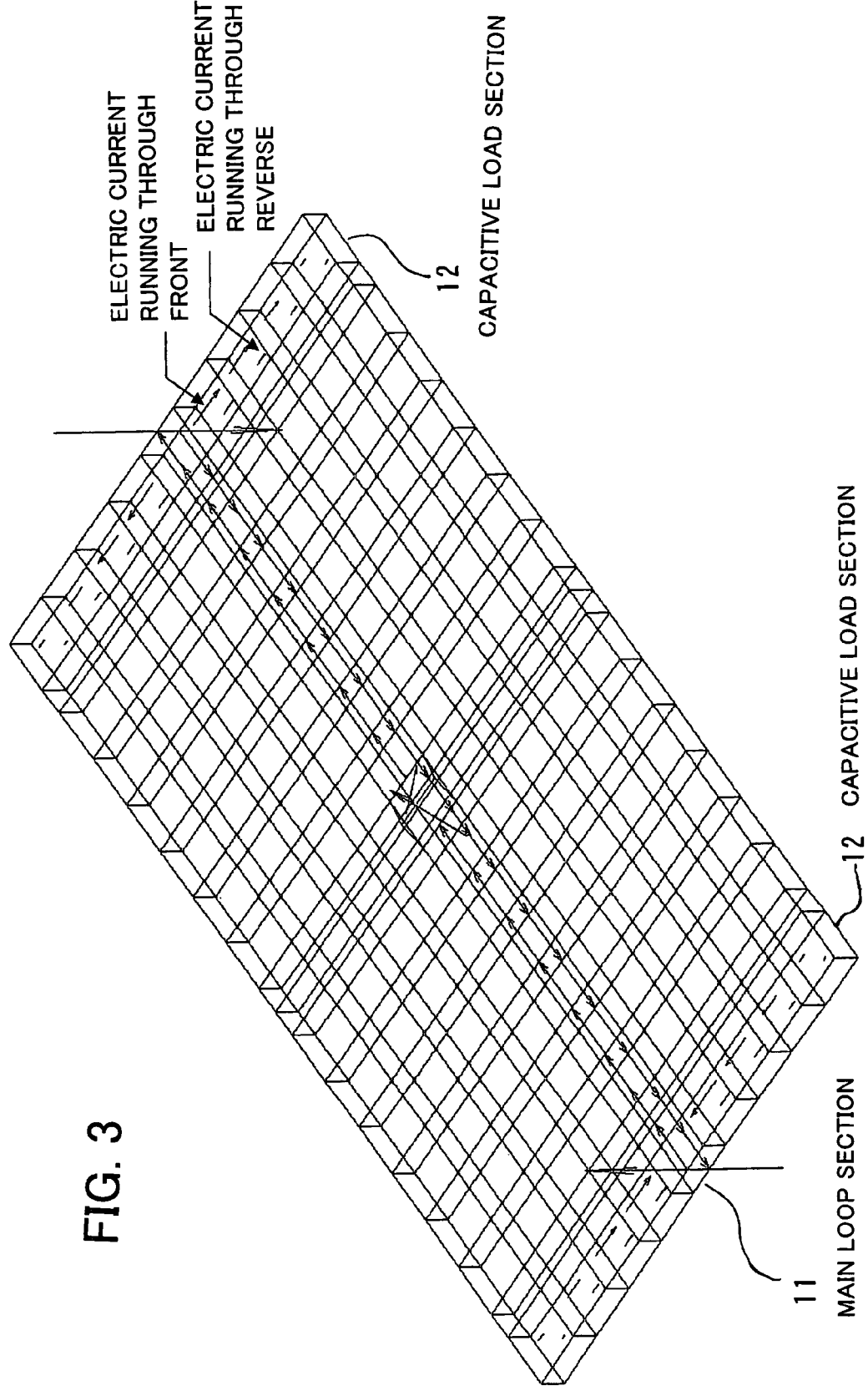
FIG. 3 is a view showing an electric current running through the antenna unit.

FIG. 3 is a view showing an electric current running through the antenna unit 10. An electric current which runs through the antenna unit 10 is simulated and how an electric current runs is indicated by arrows. When radio waves are radiated or received, an electric current runs through the antenna unit 10. However, the major part of the electric current runs through the main loop section 11 (main loop section 11 has the shape of a loop, so the major part of the electric current makes the circuit of the loop including the front side and the reverse side) and only a small part of the electric current runs through the capacitive load sections 12.

Problems solved by and effects obtained by the tag device 1 will now be described. The tag device 1 includes the antenna unit 10 described in FIGS. 2 and 3. Accordingly, the problems with conventional IC tags using a UHF band are solved and the following effects (1) to (4) are obtained.

(1) Even when the tag device 1 is used near a person's body, good radio wave radiation and receiving characteristics can be obtained.

(2) The impedance of the antenna (main loop section 11) can easily be adjusted, so the impedance of the antenna can efficiently be made to match the impedance of the IC chip (control unit 20).

(3) Even when the tag device 1 is placed near an object which interferes with radio wave radiation or receiving, electromagnetic interference can be minimized.

(4) When the tag device 1 is placed on an IC tag using the 13.56 MHz frequency band, the tag device 1 does not intercept magnetic flux produced by the IC tag using the 13.56 MHz frequency band. That is to say, the tag device 1 does not have a bad influence on communication performed by the IC tag using the 13.56 MHz frequency band.

In addition to these effects, the tag device 1 has various characteristics. For example, wide band communication can be performed by using the tag device 1, compared with the case where a conventional IC tag using a UHF band is used. The function and operation of the tag device 1 concerning these characteristics will now be described in detail.

The tag device 1 is used as a portable card by putting the antenna unit 10 and the control unit 20 into a portable member in the shape of a card. For example, the tag device 1 can widely be used as an ID card, a cash card, or a railroad commutation-ticket card.

Material for the member in the shape of a card may be, for example, plastic. The antenna unit 10 may be put inside the member or be stuck on the member.

However, it is provided in Japan that the size of cards shall be 54 mm (length)×86 mm (breadth)×0.76 mm (thickness). Accordingly, the size of the tag device 1 must be smaller than or equal to this card size.

Figure 4:
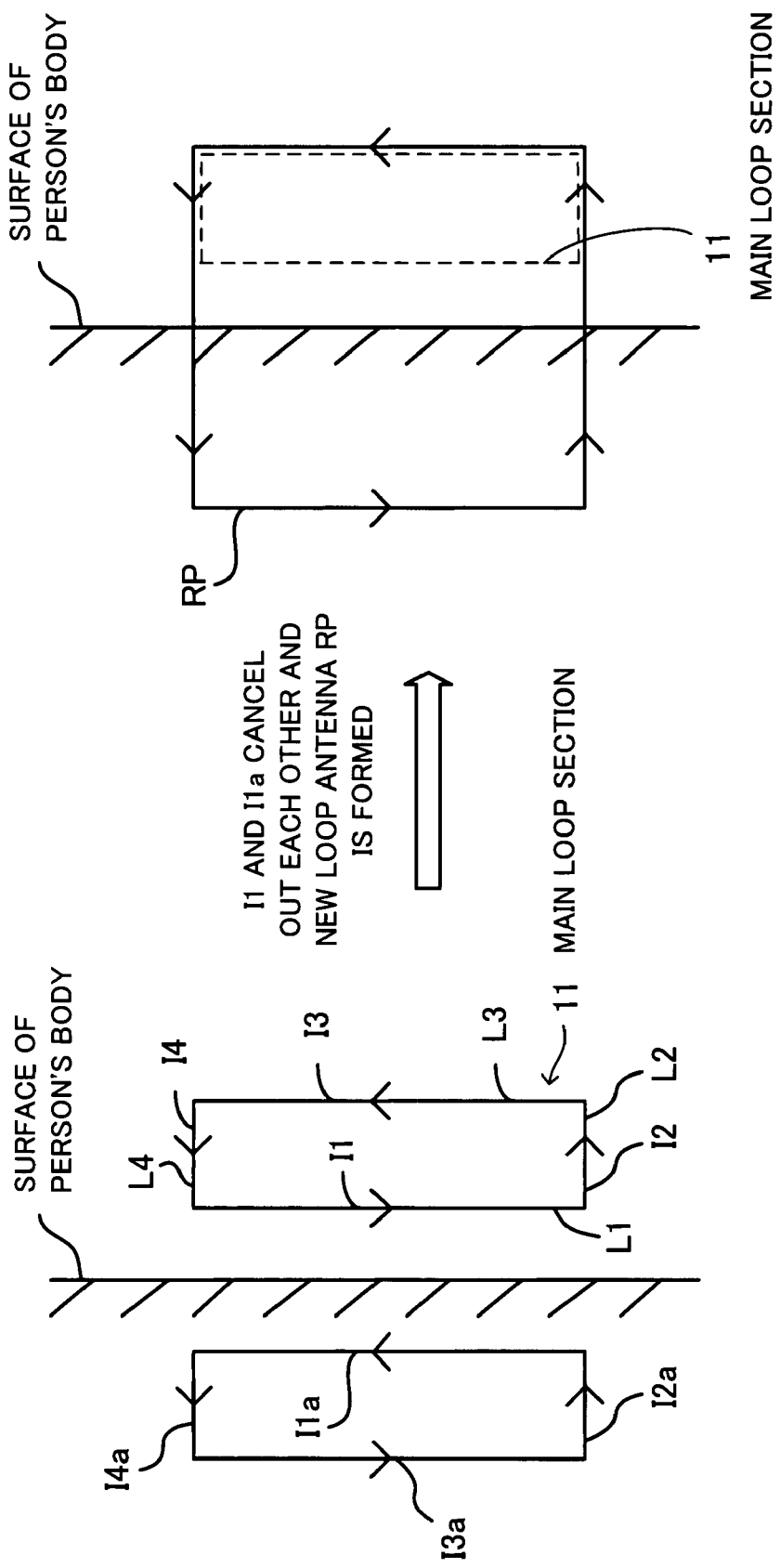
FIG. 4 is a view for describing the operation of a main loop section performed at the time of the tag device being near a person's body.

The operation of the tag device 1 near a person's body will now be described. FIG. 4 is a view for describing the operation of the main loop section 11 performed at the time of the tag device 1 being near a person's body.

FIG. 4 shows how the main loop section 11 of the tag device 1 is near a person's body.

It is assumed that the main loop section 11 is a loop including lines L1 through L4 and that when radio waves are radiated or received, an electric current runs counterclockwise through the main loop section 11. For convenience of explanation electric currents which run through the lines L1 through L4 are marked with the symbols "I1, " "I, " "I, " and "I4 " respectively.

An electric current runs through the main loop section 11 as a loop. When the electric current I1 runs downward through the line L1 parallel to the surface of the person's body, an upward electric current I1$a$ is generated at the surface of the person's body. The electric current I1$a$ and the electric current I1 flow in opposite directions. When the electric current I2 runs rightward through the line L2 perpendicular to the surface of the person's body, a rightward electric current I2$a$ is generated at the surface of the person's body. The electric current I2$a$ and the electric current I2 flow in the same direction.

When the electric current I3 runs upward through the line L3 parallel to the surface of the person's body, a downward electric current I3$a$ is generated at the surface of the person's body. The electric current I3$a$ and the electric current I3 flow in opposite directions. When the electric current I4 runs leftward through the line I4 perpendicular to the surface of the person's body, a leftward electric current I4$a$ is generated at the surface of the person's body. The electric current I4$a$ and the electric current I4 flow in the same direction.

When such electric current distribution is created, the electric current I1 which runs through the line L1 nearest the surface of the person's body and the electric current I1$a$ generated at the surface of the person's body cancel out each other. As a result, new loop-like electric current distribution is created between the surface of the person's body and the main loop section 11. This means that a new loop antenna RP is formed via the surface of the person's body.

Accordingly, even when a portable card including the tag device 1 is put in a breast pocket or is put over a reader/writer with a hand, the radio wave radiation and receiving characteristics are not deteriorated by the person's body. That is to say, even when the tag device 1 is used near the person's body, good radio wave radiation and receiving characteristics can be obtained.

Wide band communication realized by connecting the capacitive load sections 12 to the main loop section 11 will now be described. FIG. 5 is a schematic view showing the electric field strength of radiated UHF band radio waves. In FIG. 5, a vertical axis indicates the electric field strength of a radiated radio wave and a horizontal axis indicates a frequency (MHz).

Graph G1 indicates the state of a narrow band centered at 953 MHz in the UHF band. Graph G2 indicates the state of a wide band centered at 953 MHz in the UHF band (graph G2 indicates distribution of electric field strength in the present invention by which wide band communication can be performed by the use of the UHF band because of the presence of the capacitive load sections 12).

As stated above, 952 to 954 MHz is used for RFID communication in the UHF band. In the case of graph G1, an electric current runs fully through an antenna only at frequencies of 952 to 954 MHz and radio waves are radiated. Such an antenna is not desirable. In the case of graph G2, however, an antenna can fully radiate radio waves in a relatively wide frequency range centered at 952 to 954 MHz. Such an antenna should be fabricated.

The reason for this is as follows. When products are manufactured, variation in material and the like cause frequency variation. Accordingly, even if there is slight frequency variation, antennas should function with accuracy. With the tag device 1, wide band communication can be performed by connecting the capacitive load sections 12 to the main loop section 11.

Figure 6:
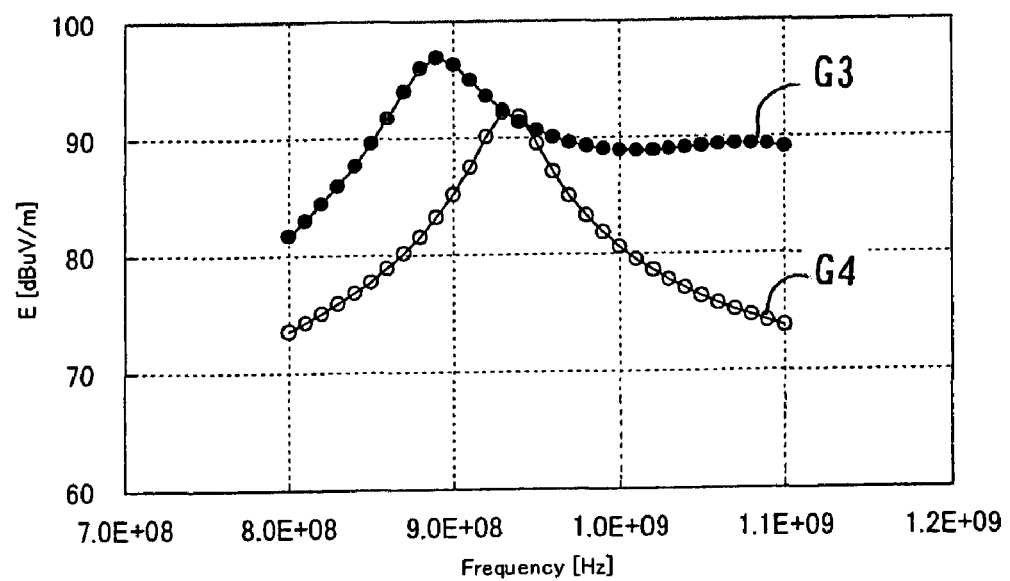
FIG. 6 is a view showing results obtained by calculating the electric field strength of radiated electromagnetic waves both in the case of capacitive load sections being included and in the case of capacitive load sections not being included.

FIG. 6 is a view showing results obtained by calculating the electric field strength of radiated electromagnetic waves both in the case of the capacitive load sections 12 being included and in the case of the capacitive load sections 12 not being included. In FIG. 6, a vertical axis indicates electric field strength E (dBµV/m) and a horizontal axis indicates a frequency (Hz) ($\alpha E + \beta = \alpha \times 10\beta$). Electric field strength is calculated by simulating a value at a point two meters distant from the tag device 1 by a moment method.

The size of the tag device 1 used for calculating electric field strength is 4.5 cm×7.5 cm×0.5 mm. The electric constant and dielectric loss of the dielectric substrate 30 are 3.9 and 0.008 respectively. The internal impedance of the control unit 20 which functions as a radiator is 20 Ω-180 jΩ and the control unit 20 is a voltage source of 1V.

As can be seen from FIG. 6, a band shown by graph G3 which indicates the electric field strength of the main loop section 11 to which the capacitive load sections 12 are connected is wider than a band shown by graph G4 which indicates the electric field strength of the main loop section 11 to which the capacitive load sections 12 are not connected.

Impedance matching between the main loop section 11 and the control unit 20 will now be described. The control unit 20 is connected to the main loop section 11 and electric power outputted from the control unit 20 is radiated into the air as radio waves via the main loop section 11.

A traveling wave propagates anywhere on the main loop section 11 with the relation "voltage/electric current=impedance (characteristic impedance) Z" maintained. When a load resistor $R_L$ the impedance of which is Z is connected, the whole of the traveling wave enters the load resistor $R_L$ and is dissipated. As a result, heat is radiated and the load resistor $R_L$ does not reflect the traveling wave.

That is to say, if the impedance of the main loop section 11 is equal to that of the control unit 20 (impedance matching is realized), only a traveling wave outputted from the control unit 20 propagates and electric energy the traveling wave has is all supplied to the main loop section 11, which is an antenna, and is radiated. However, complete impedance matching is an ideal state which can theoretically be realized. How practical design close to this ideal state can be made is important.

The results of experiments in which the impedance of the main loop section 11 is changed by changing the area of the capacitive load sections 12 will now be described. An easy method for changing the area of the capacitive load sections 12 is to cut off part of the capacitive load sections 12, that is to say, to change the length of the capacitive load sections 12.

Figure 7:
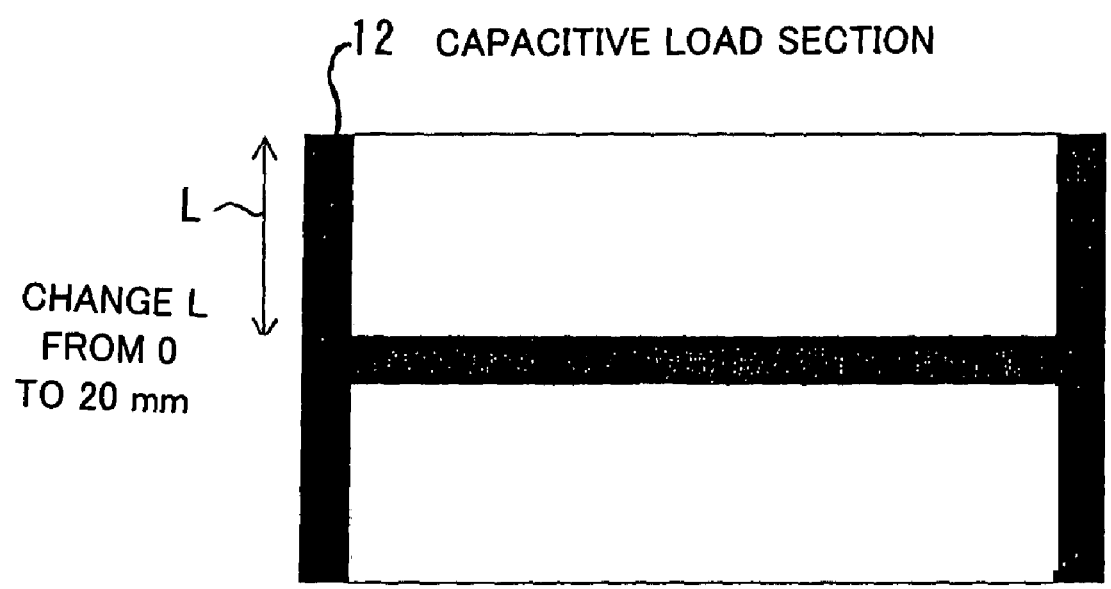
FIG. 7 is a view showing how the length of the capacitive load sections is changed.

FIG. 7 is a view showing how the length of the capacitive load sections 12 is changed. The length L of a portion of the capacitive load section 12 shown in FIG. 7 is changed in the range of 0 to 20 mm.

Figure 8:
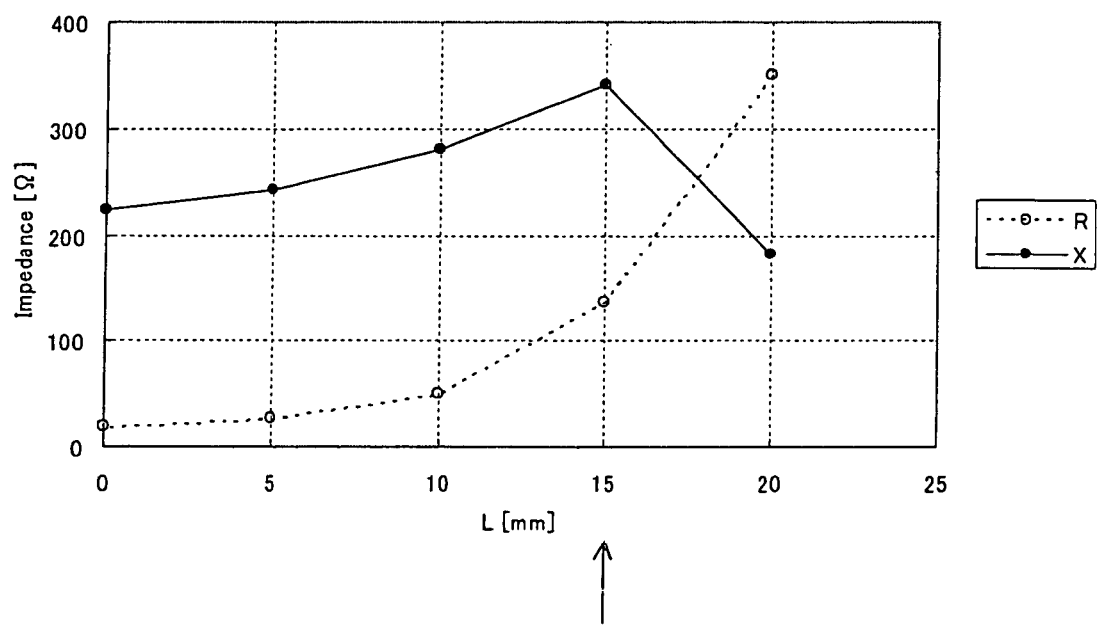
FIG. 8 is a view showing the impedance of the main loop section.

FIG. 8 is a view showing the impedance of the main loop section 11. In FIG. 8, a vertical axis indicates impedance (Ω) and a horizontal axis indicates the length L (mm) of the capacitive load section 12. FIG. 8 shows how the impedance of the main loop section 11 changes when the length L shown in FIG. 7 is changed in the range of 0 to 20 mm.

As can be seen from FIG. 8, the impedance of the main loop section 11 changes by changing the length L of the portion of the capacitive load section 12 shown in FIG. 7. It is simply assumed that 120 Ω+j320 Ω is obtained as the value of the internal impedance of the control unit 20 by making measurements with a network analyzer. Then impedance matching is realized by setting the length L of the portion of the capacitive load section 12 shown in FIG. 7 to 15 mm.

The impedance Z is given by $$Z=R\pm jX$$

where R included in the real part is resistance (resistance component) and X included in the imaginary part is reactance (capacitance or inductance component given by condensers or coils). (The impedance of the IC is given by $Z_{IC}=R_{IC}-jX_{IC}$ and the impedance of the antenna is given by $Z_A=R_A+jX_A$.)

With the tag device 1 according to the present invention, the impedance of the main loop section 11 can be changed in this way only by changing the area of the capacitive load sections 12. Therefore, the internal impedance of the control unit 20 (IC chip) should be measured in advance with a network analyzer or the like. The area of the capacitive load sections 12 is changed so that the impedance of the main loop section 11 will be approximately identical to the internal impedance of the control unit 20. By doing so, impedance matching can be realized efficiently. (As stated above, impedance includes resistance R and reactance X. That is to say, impedance includes the two parameters. Accordingly, it is really difficult to make the values of the resistance R and the reactance X included in the impedance of the main loop section 11 match the values of the resistance R and the reactance X, respectively, included in the internal impedance of the control unit 20. However, the length of the capacitive load sections 12 should be adjusted so that the value of the reactance X included in the impedance of the main loop section 11 will preferentially match the value of the reactance X included in the internal impedance of the control unit 20. By doing so, the accuracy of impedance matching is improved. This was confirmed by experiments.)

Figure 9:
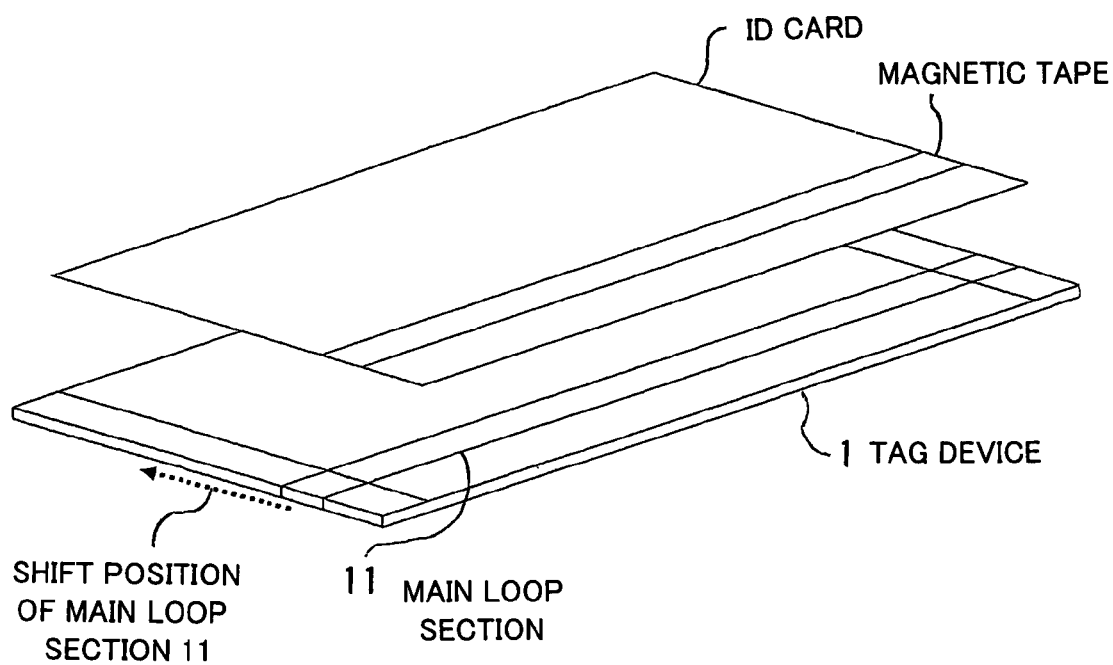
FIG. 9 is a view showing the tag device on which an ID card including a magnetic tape is placed.

The case where the tag device is placed near an object which interferes with radio wave radiation or receiving will now be described. FIG. 9 is a view showing the tag device 1 on which an ID card including a magnetic tape is placed. If an ID card is placed on the tag device 1 and a magnetic tape of the ID card is on the main loop section 11 of the tag device 1, they cause radio wave interference to each other.

Therefore, in the tag device 1 the main loop section 11 is located on the dielectric substrate 30 so that it will be distant from the position of the magnetic tape (or another object which interferes with radio wave radiation or receiving). This minimizes the interaction between the magnetic tape and the main loop section 11.

Figure 10:
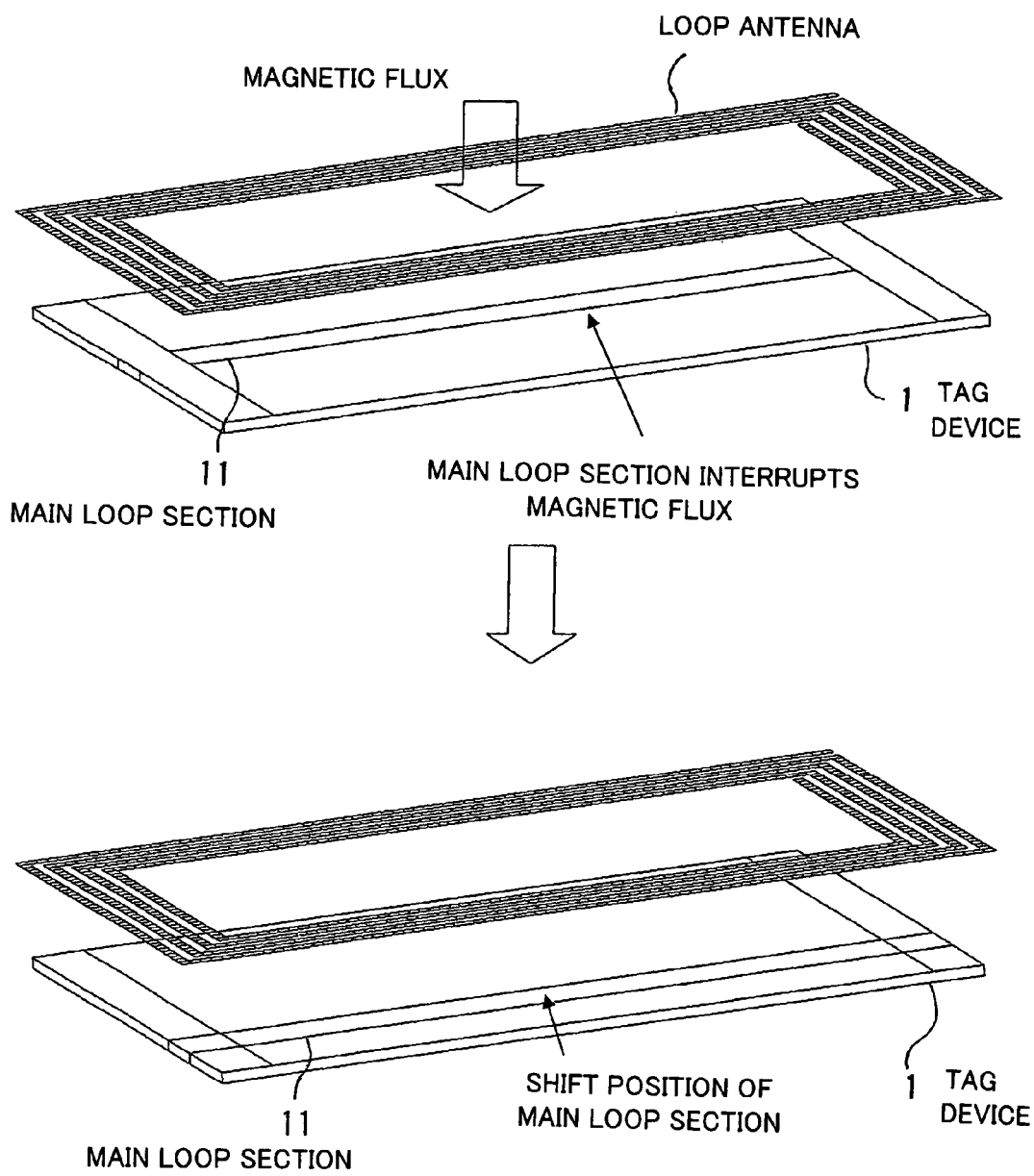
FIG. 10 is a view showing the tag device on which a card using the 13.56 MHz frequency band is placed.

The case where a card using the 13.56 MHz frequency band is placed on the tag device 1 will now be described. FIG. 10 is a view showing the tag device 1 on which a card using the 13.56 MHz frequency band is placed. As stated above, a loop antenna that produces magnetic flux is inside the card using the 13.56 MHz frequency band. If the main loop section 11 of the tag device 1 is in the middle of a card and the card using the 13.56 MHz frequency band is on the main loop section 11, then the main loop section 11 interrupts the flow of the magnetic flux and interferes with the reading of the card using the 13.56 MHz frequency band (conversely, the magnetic flux causes a sending fault or a receiving fault to the main loop section 11).

Therefore, in the tag device 1 the main loop section 11 is located on the dielectric substrate 30 so that it will be distant from the middle of the loop antenna inside the card using the 13.56 MHz frequency band. By doing so, the flow of the magnetic flux produced by the card using the 13.56 MHz frequency band is not interrupted. (In FIG. 10, the main loop section 11 is shifted from the middle of a card to an edge portion of the card.)

Figure 11:
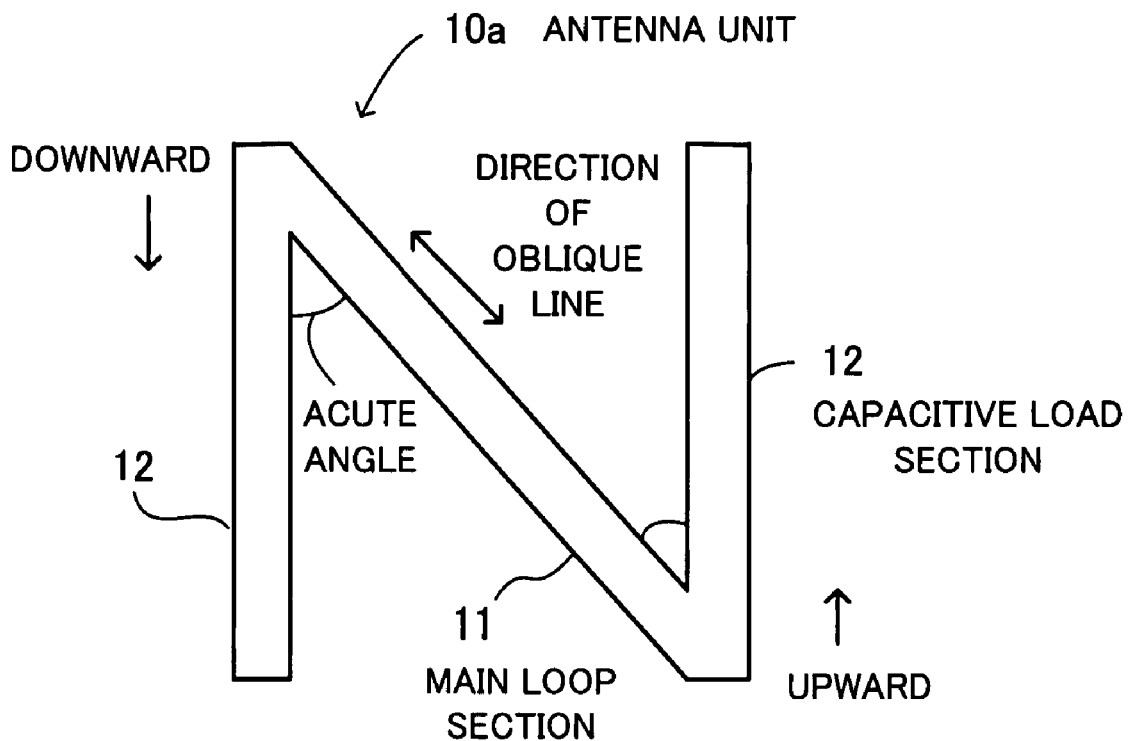
FIG. 11 is a view showing a modification of the antenna unit.
Figure 12:
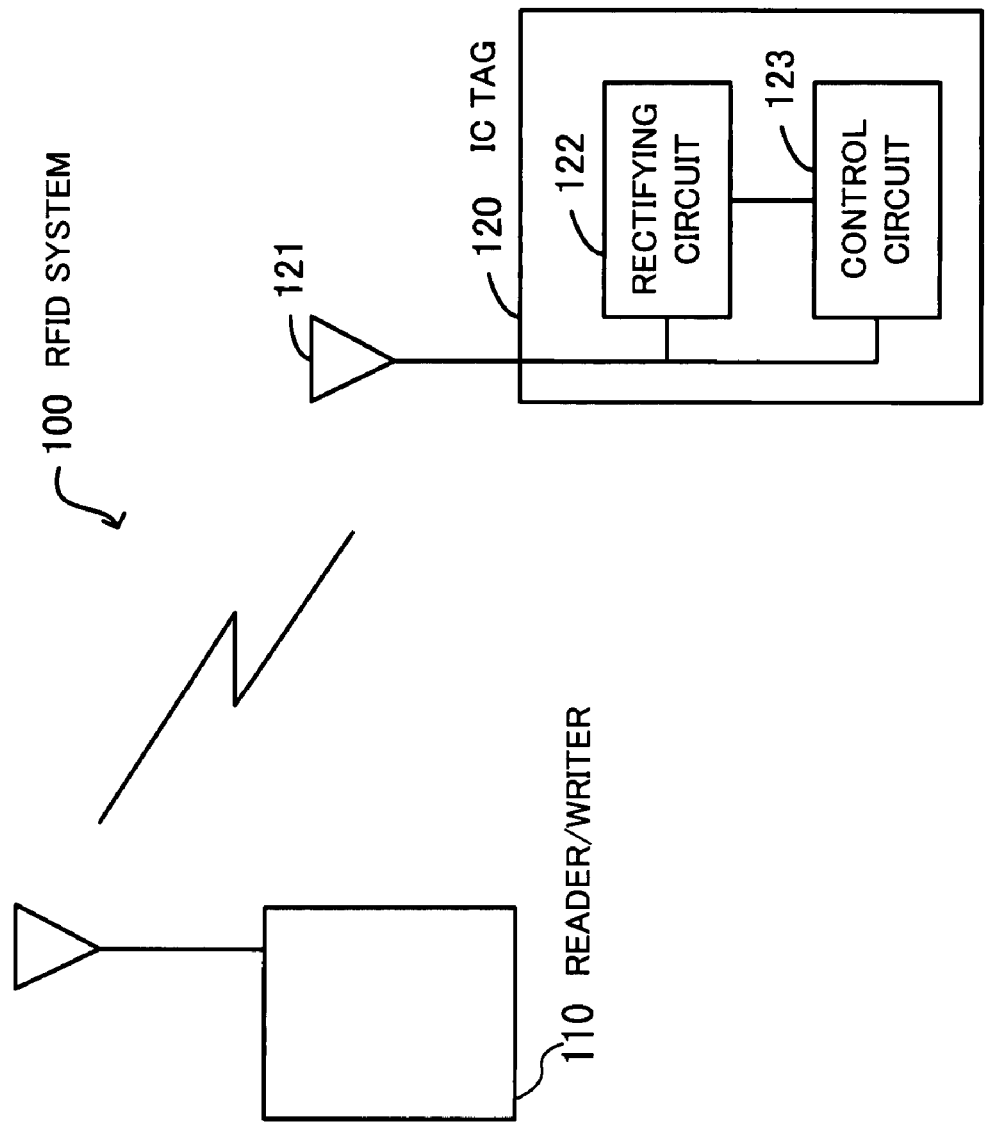
FIG. 12 is a view showing the concept of the radio wave method.
Figure 13:
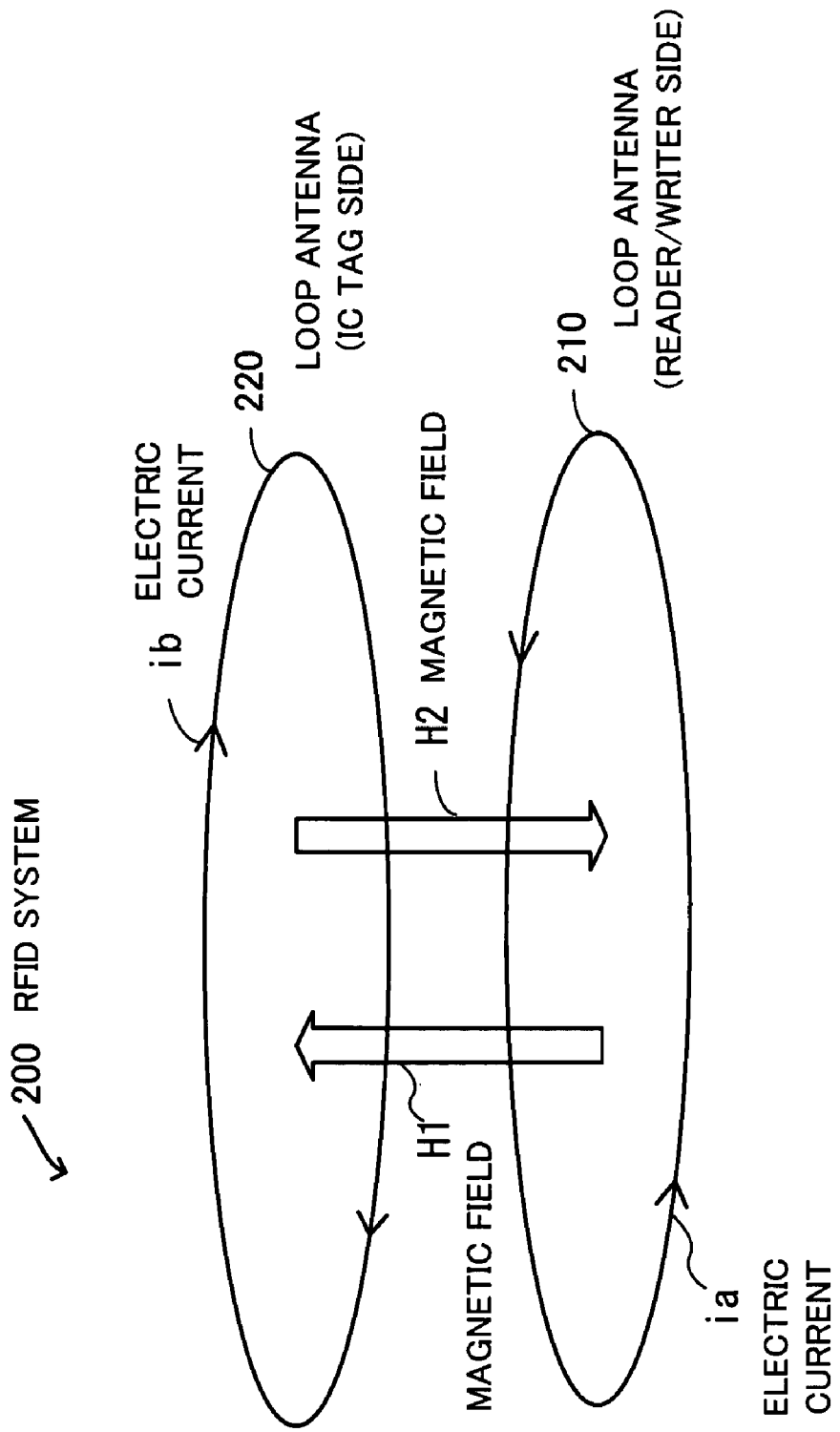
FIG. 13 is a view showing the concept of the electromagnetic induction method.
Figure 15:
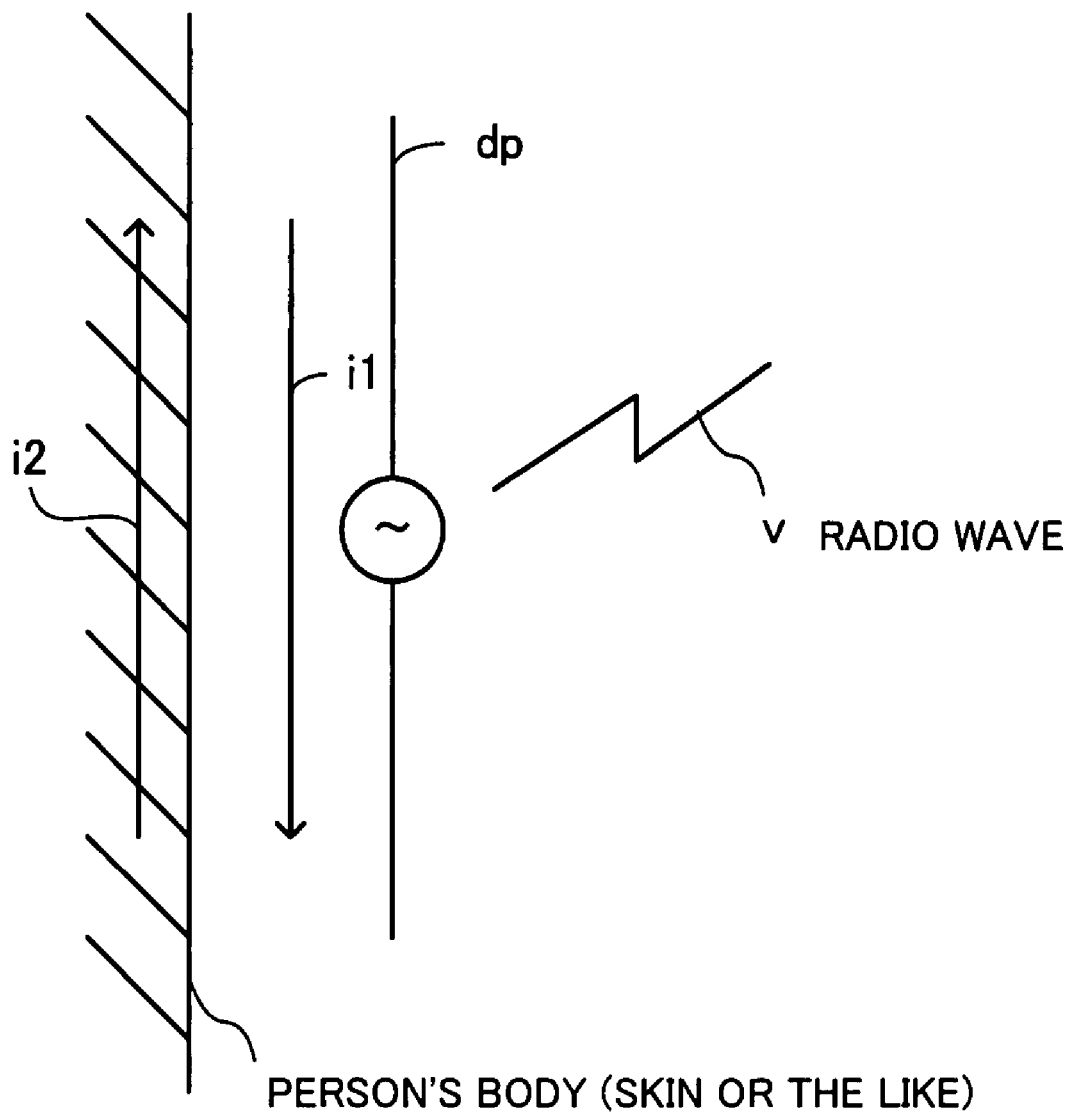
FIG. 15 is a view showing a problem with a conventional card using a UHF band.
Figure 16:
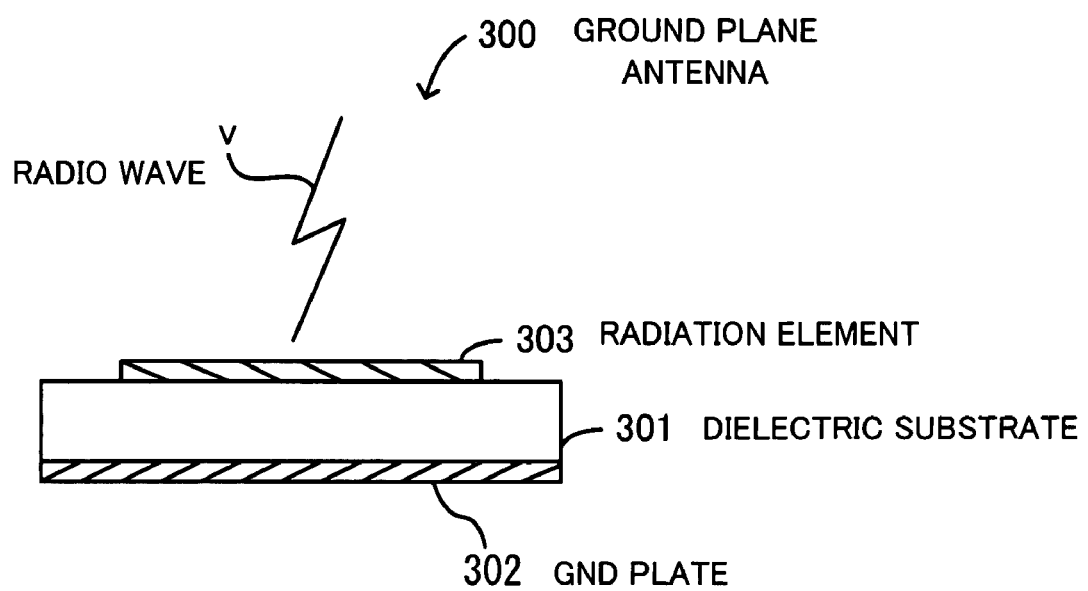
FIG. 16 is a view showing a ground plane antenna.

A modification of the antenna unit 10 will now be described. FIG. 11 is a view showing a modification of the antenna unit 10. With the above antenna unit 10, the capacitive load sections 12 are connected perpendicularly to both end portions of the loop-like main loop section 11. As a result, the antenna unit 10 has the shape of the letter "H". With an antenna unit 10a which is a modification of the antenna unit 10, end portions of capacitive load sections 12 are connected upward and downward to both end portions of a loop-like main loop section 11 at acute angles. As a result, the antenna unit 10a has the shape of the letter "N".

A main loop section 11 of the antenna unit 10a has the shape of a long thin loop and its area is smaller than the area of a dielectric substrate (not shown). The main loop section 11 is mounted so as to cover part of the surfaces of the dielectric substrate and part of sides of the dielectric substrate. That is to say, the dielectric substrate is put inside the loop. In this case, the main loop section 11 is mounted in the direction of an oblique line of the dielectric substrate.

The capacitive load sections 12 are located at both end portions of the main loop section 11 which covers part of the front side of the dielectric substrate. In addition, the capacitive load sections 12 are located at both end portions of the main loop section 11 which covers part of the reverse side of the dielectric substrate. (The dielectric substrate is put between two N-shaped antennas (not shown). The main loop section 11 is also located on sides of the dielectric substrate and loops around the dielectric substrate. The capacitive load sections 12 are not located on the sides of the dielectric substrate.)

When the tag device 1 is put into a card the size of which is laid down (54 mm (length)×86 mm (breadth)×0.76 mm (thickness) in Japan), the N-shaped antenna which is a modification of the antenna unit 10 may be used to increase the length of the main loop section 11 (antenna length). In this case, the same effect that is obtained by using the H-shaped antenna can be achieved.

As has been described in the foregoing, the tag device 1 and the portable card according to the present invention are realized by putting the antenna unit 10 including the main loop section 11 and the capacitive load sections 12 into a thin card. Even if the tag device 1 or the portable card according to the present invention on which another ID card or the like is placed is used near a person's body, good sending and receiving characteristics can be obtained. In addition, even if an IC tag card using the 13.56 MHz frequency band is placed on the tag device 1 or the portable card according to the present invention, the tag device 1 or the portable card does not have a bad influence on the IC tag card. Furthermore, by changing the area of the capacitive load sections, impedance matching between the main loop section 11 and the IC chip (control unit 20) can be realized. Accordingly, effective RFID services can be provided when the introduction of information technology and automation are promoted in the whole of the future industrial world.

The above descriptions are based on the premise that the present invention is applied to a card using a UHF band. However, the present invention is not limited to cards using a UHF band. The principles underlying the present invention can widely be applied to cards using other frequency bands.

In the above descriptions the tag device 1 applied to a portable RFID card includes the antenna unit 10 in the shape of the letter "H" or "N". However, the shape of the antenna unit 10 is not limited to the letter "H" or "N". The antenna unit 10 in a shape other than the letter "H" or "N" may be formed by connecting the capacitive load sections 12 to the main loop section 11. The antenna unit 10 can widely be applied not only in the field of the RFID but also in another field of communication using high frequencies.

According to the present invention the tag device comprises the antenna unit including the main loop section being a loop-like metal foil mounted on the surface of the dielectric substrate for sending and receiving radio waves and the capacitive load section being a metal foil connected to the main loop section and having a load corresponding to a capacitance component. As a result, even when the tag device is near a person's body, radio wave radiation or receiving characteristics do not deteriorate. In addition, it is possible to perform high-quality radio communication without hindering communication by another IC tag.

According to the present invention an antenna comprises a main loop section being a loop-like metal mounted on a surface of a dielectric substrate for sending and receiving radio waves and a capacitive load section being a metal connected to the main loop section and having a load corresponding to a capacitance component. As a result, even when the antenna is near a person's body, radio wave radiation or receiving characteristics do not deteriorate. In addition, it is possible to perform high-quality radio communication without hindering communication by another IC tag.

According to the present invention a portable card comprises an antenna unit including a main loop section being a loop-like metal foil mounted on a surface of a dielectric substrate for sending and receiving radio waves and a capacitive load section being a metal foil connected to the main loop section and having a load corresponding to a capacitance component and is formed of a card-like member which a person can carry. As a result, even when the portable card is near a person's body, radio wave radiation or receiving characteristics do not deteriorate. In addition, it is possible to perform high-quality radio communication without hindering communication by another IC tag.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A tag device for performing radio communication, the device comprising:
    an antenna unit including:
    a main loop section being a loop metal foil mounted on a surface of a dielectric substrate for sending and receiving radio waves, and
    capacitive load sections being metal foils connected to the main loop section and each having a load corresponding to a capacitance component; and
    a control unit connected to the main loop section for controlling information via the radio waves;
    wherein when the tag device is located near a person's body, loop electric current distribution is created between a surface of the person's body and the main loop section by an electric current which runs through the main loop section and the antenna unit functions as a loop antenna via the surface of the person's body.

2. The tag device according to claim 1, wherein:
    the main loop section has the shape of a long thin loop, is smaller than the dielectric substrate in area, covers part of surfaces of the dielectric substrate and part of sides of the dielectric substrate so as to put the dielectric substrate inside the loop, and is mounted in a horizontal direction of the dielectric substrate; and
    the capacitive load sections are located at both end portions of the main loop section which covers part of a front side of the dielectric substrate and at both end portions of the main loop section which covers part of a reverse side of the dielectric substrate.

3. The tag device according to claim 1, wherein:
    the main loop section has the shape of a long thin loop, is smaller than the dielectric substrate in area, covers part of surfaces of the dielectric substrate and part of sides of the dielectric substrate so as to put the dielectric substrate inside the loop, and is mounted in the direction of an oblique line of the dielectric substrate; and
    the capacitive load sections are located at both end portions of the main loop section which covers part of a front side of the dielectric substrate and at both end portions of the main loop section which covers part of a reverse side of the dielectric substrate.

4. The tag device according to claim 1, wherein by connecting the capacitive load sections to the main loop section in the antenna unit, a band corresponding to electric field strength of the radio waves sent or received by the main loop section is made wide.

5. The tag device according to claim 1, wherein:
impedance of the main loop section can be changed by changing area of the capacitive load sections; and
the capacitive load sections the area of which is adjusted so as to make impedance of the control unit match the impedance of the main loop section are located on the dielectric substrate.

6. The tag device according to claim 1, wherein when the tag device is located near an object which interferes with radiation or receiving of the radio waves, the main loop section is located on the dielectric substrate so that the main loop section is distant from a position of the object.

7. The tag device according to claim 1, wherein when the tag device is located near an apparatus which performs electromagnetic induction, the main loop section is located on the dielectric substrate so as not to interrupt magnetic flux produced by the electromagnetic induction.

8. An antenna for radiating and receiving radio waves, the antenna comprising:
a main loop section being loop metal for sending and receiving the radio waves; and
capacitive load sections being metal connected to the main loop section and each having a load corresponding to a capacitance component;
wherein when the antenna is located near a person's body, loop electric current distribution is created between a surface of the person's body and the main loop section by an electric current which runs through the main loop section and the antenna functions as a loop antenna via the surface of the person's body.

9. The antenna according to claim 8, wherein the capacitive load sections are connected perpendicularly to both end portions of the loop main loop section to form a structure in the shape of the letter H.

10. The antenna according to claim 8, wherein end portions of the capacitive load sections are connected upward and downward to both end portions of the loop main loop section at acute angles to form a structure in the shape of the letter N.

11. The antenna according to claim 8, wherein if the antenna is mounted on a dielectric substrate:
the main loop section has the shape of a long thin loop, is smaller than the dielectric substrate in area, covers part of surfaces of the dielectric substrate and part of sides of the dielectric substrate so as to put the dielectric substrate inside the loop, and is mounted in a horizontal direction of the dielectric substrate; and
the capacitive load sections are located at both end portions of the main loop section which covers part of a front side of the dielectric substrate and at both end portions of the main loop section which covers part of a reverse side of the dielectric substrate.

12. The antenna according to claim 8, wherein if the antenna is mounted on a dielectric substrate:
the main loop section has the shape of a long thin loop, is smaller than the dielectric substrate in area, covers part of surfaces of the dielectric substrate and part of sides of the dielectric substrate so as to put the dielectric substrate inside the loop, and is mounted in the direction of an oblique line of the dielectric substrate; and
the capacitive load sections are located at both end portions of the main loop section which covers part of a front side of the dielectric substrate and at both end portions of the main loop section which covers part of a reverse side of the dielectric substrate.

13. The antenna according to claim 8, wherein by connecting the capacitive load sections to the main loop section, a band corresponding to electric field strength of the radio waves sent or received by the main loop section wide is made wide.

14. The antenna according to claim 8, wherein:
impedance of the main loop section can be changed by changing area of the capacitive load sections; and
if a control unit for controlling information via the radio waves is connected to the main loop section, the area of the capacitive load sections is adjusted so as to make impedance of the control unit match the impedance of the main loop section.

15. The antenna according to claim 8, wherein when the antenna is located near an object which interferes with radiation or receiving of the radio waves, the main loop section is connected to the capacitive load sections so that the main loop section is distant from a position of the object.

16. The antenna according to claim 8, wherein when the antenna is located near an apparatus which performs electromagnetic induction, the main loop section is connected to the capacitive load sections so as not to interrupt magnetic flux produced by the electromagnetic induction.

17. A portable card for performing radio communication, the card comprising:
an antenna unit including:
a main loop section being a loop metal foil mounted on a surface of a dielectric substrate for sending and receiving radio waves, and
capacitive load sections being metal foils connected to the main loop section and each having a load corresponding to a capacitance component;
a control unit connected to the main loop section for controlling information via the radio waves; and
a member having the shape of a portable card for housing the antenna unit and the control unit;
wherein when the portable card is located near a person's body, loop electric current distribution is created between a surface of the person's body and the main loop section by an electric current which runs through the main loop section and the antenna unit functions as a loop antenna via the surface of the person's body.

18. The portable card according to claim 17, wherein:
the main loop section has the shape of a long thin loop, is smaller than the dielectric substrate in area, covers part of surfaces of the dielectric substrate and part of sides of the dielectric substrate so as to put the dielectric substrate inside the loop, and is mounted in a horizontal direction of the dielectric substrate; and
the capacitive load sections are located at both end portions of the main loop section which covers part of a front side of the dielectric substrate and at both end portions of the main loop section which covers part of a reverse side of the dielectric substrate.

19. The portable card according to claim 17, wherein:
the main loop section has the shape of a long thin loop, is smaller than the dielectric substrate in area, covers part of surfaces of the dielectric substrate and part of sides of the dielectric substrate so as to put the dielectric substrate inside the loop, and is mounted in the direction of an oblique line of the dielectric substrate; and
the capacitive load sections are located at both end portions of the main loop section which covers part of a front side of the dielectric substrate and at both end portions of the main loop section which covers part of a reverse side of the dielectric substrate.

20. The portable card according to claim 17, wherein by connecting the capacitive load sections to the main loop section in the antenna unit, a band corresponding to electric field strength of the radio waves sent or received by the main loop section is made wide.

21. The portable card according to claim 17, wherein:

impedance of the main loop section can be changed by changing area of the capacitive load sections; and the capacitive load sections the area of which is adjusted so as to make impedance of the control unit match the impedance of the main loop section are located on the dielectric substrate.

22. The portable card according to claim 17, wherein when the portable card is located near an object which interferes with radiation or receiving of the radio waves, the main loop section is located on the dielectric substrate so that the main loop section is distant from a position of the object.

23. The portable card according to claim 17, wherein when the portable card is located near an apparatus which performs electromagnetic induction, the main loop section is located on the dielectric substrate so as not to interrupt magnetic flux produced by the electromagnetic induction.

* * * * *